US008833794B2

(12) United States Patent
Yi

(10) Patent No.: US 8,833,794 B2
(45) Date of Patent: Sep. 16, 2014

(54) BABY CARRIAGE

(71) Applicant: Ze-Hua Yi, Guangdong (CN)

(72) Inventor: Ze-Hua Yi, Guangdong (CN)

(73) Assignee: Wonderland Nurserygoods Company Limited, Kwai Chung, N.T. (HK)

( * ) Notice: Subject to any disclaimer, the term of this patent is extended or adjusted under 35 U.S.C. 154(b) by 0 days.

(21) Appl. No.: 13/717,606

(22) Filed: Dec. 17, 2012

(65) Prior Publication Data

US 2013/0154240 A1   Jun. 20, 2013

(30) Foreign Application Priority Data

Dec. 19, 2011   (CN) .......................... 2011 1 0428065

(51) Int. Cl.
*B62B 7/06* (2006.01)
*B62B 7/04* (2006.01)
*B62B 7/08* (2006.01)
*B62B 9/10* (2006.01)

(52) U.S. Cl.
CPC ............. *B62B 7/044* (2013.01); *B62B 9/104* (2013.01); *B62B 2205/20* (2013.01); *B62B 2205/26* (2013.01); *B62B 7/08* (2013.01)
USPC ............................ 280/639; 280/647; 280/649

(58) Field of Classification Search
USPC ......... 280/639, 647–650, 658, 293, 295, 297, 280/296, 47.38, 47.4
See application file for complete search history.

(56) References Cited

U.S. PATENT DOCUMENTS

| | | | | |
|---|---|---|---|---|
| 5,722,682 A | * | 3/1998 | Wang | 280/642 |
| 5,725,238 A | * | 3/1998 | Huang | 280/642 |
| 6,273,451 B1 | * | 8/2001 | Julien et al. | 280/642 |
| 6,375,213 B1 | * | 4/2002 | Suzuki | 280/649 |
| 6,382,652 B1 | * | 5/2002 | Cheng | 280/293 |
| 6,712,382 B2 | * | 3/2004 | Song | 280/642 |
| 6,910,708 B2 | * | 6/2005 | Sack et al. | 280/642 |
| 7,871,100 B2 | * | 1/2011 | Chen et al. | 280/642 |
| 2003/0201625 A1 | | 10/2003 | Espenshade | |
| 2004/0113394 A1 | * | 6/2004 | Cheng | 280/647 |
| 2006/0237949 A1 | | 10/2006 | Hou | |
| 2008/0073879 A1 | * | 3/2008 | Chen et al. | 280/642 |
| 2008/0238042 A1 | * | 10/2008 | Chen et al. | 280/650 |
| 2011/0215552 A1 | * | 9/2011 | Cheng | 280/650 |

FOREIGN PATENT DOCUMENTS

| | | | | |
|---|---|---|---|---|
| CN | 2780578 | Y | | 5/2006 |
| CN | 101362473 | A | * | 2/2009 |
| CN | 201240405 | Y | | 5/2009 |
| EP | 567422 | A1 | * | 10/1993 |
| GB | 2 351 044 | A | | 12/2000 |
| JP | 2009083844 | A | * | 4/2009 |

OTHER PUBLICATIONS

ProQuest Dialog Machine translation of CN101362473.*

* cited by examiner

*Primary Examiner* — J. Allen Shriver, II
*Assistant Examiner* — Steve Clemmons
(74) *Attorney, Agent, or Firm* — Winston Hsu; Scott Margo

(57) ABSTRACT

A baby carriage includes a wheel assembly and a foldable frame connected to the wheel assembly. The foldable frame includes a front leg, a rear leg, a push handle located above the rear leg and connected to the front leg, a connecting rod, and a basket tube located on the rear leg. The front leg and the rear leg are connected to the wheel assembly. The push handle is pivotally connected to the front leg. An end of the connecting rod is pivotally connected to the rear leg. The baby carriage of the invention can be folded so as to avoid occupying much space.

22 Claims, 19 Drawing Sheets

BABY CARRIAGE

BACKGROUND OF THE INVENTION

1. Field of the Invention

The invention relates to a baby product and, more particularly, to a baby carriage.

2. Description of the Prior Art

As known by everyone, parents usually use a baby carriage to carry a baby while shopping or walking instead of holding the baby in the arms so as to reduce their burden. However, since a conventional baby carriage cannot be folded, it occupies much space in storage and transportation. The baby carriage, which occupies much space, will affect people's walking indoors. Therefore, it is very inconvenient. Furthermore, so far a foldable device installed on the baby carriage is mostly complicated and hard to be operated so it is inconvenient in use.

Therefore, it is necessary to provide an improved baby carriage so as to solve the aforesaid problems.

SUMMARY OF THE INVENTION

An objective of the invention is to provide a baby carriage capable of being folded easily so as to avoid occupying much space.

To achieve the aforesaid objective, the invention provides a baby carriage comprising a wheel assembly and a foldable frame connected to the wheel assembly. The foldable frame comprises a front leg, a rear leg, a push handle located above the rear leg and connected to the front leg, a connecting rod, and a basket tube located on the rear leg. The front leg and the rear leg are connected to the wheel assembly. The push handle is pivotally connected to the front leg. An end of the connecting rod is pivotally connected to the rear leg.

Preferably, the basket tube is pivotally connected to the rear leg.

Preferably, the connecting rod is connected between the push handle and the rear leg, and another end of the connecting rod is pivotally connected to the push handle.

Preferably, the front leg is pivotally connected to the rear leg.

Preferably, a pinch-proof member is disposed at a joint between the front leg and the rear leg.

Preferably, a first connecting member is disposed on the rear leg and pivotally connected to the front leg, and the pinch-proof member is located between the front leg and the first connecting member.

Preferably, a second connecting member is fixed on the rear leg, the connecting rod is pivotally connected to the second connecting member, and the basket tube is also pivotally connected to the second connecting member.

Preferably, the connecting rod is connected between the front leg and the rear leg, and another end of the connecting rod is pivotally connected to the front leg.

Preferably, the push handle is pivotally connected to the rear leg.

Preferably, the foldable frame further comprises a lock device connected to the basket tube.

Preferably, the foldable frame further comprises a seat tube, the lock device is connected to the seat tube, a front end of the basket tube and the seat tube are rotatably connected to each other, and a front end of the seat tube is pivotally connected to the front leg.

Preferably, the lock device comprises a lock member and an unlock member, an end of the unlock member is pivotally connected to the lock member, an end of the lock member is pivotally connected to the basket tube, and another end of the lock member is fixed on the seat tube.

Preferably, an oblique groove is formed on the unlock member, a driving member is disposed on inner side of the front end of the basket tube, a lock pin is fixed on an end of the driving member, and the lock pin is slidably disposed in the oblique groove.

Preferably, a first spring is disposed in the driving member, a first rivet is slidably disposed on another end of the driving member, and both ends of the first spring abut against the driving member and the first rivet, respectively.

Preferably, a lock hook is disposed on the lock member and used for hooking the lock pin.

Preferably, a fixing ring protrudes from the unlock member and a belt is fixed on the fixing ring.

Preferably, the lock device comprises a lock member and an unlock member, the lock member is fixed on the seat tube and pivotally connected to the basket tube, and the unlock member operably restrains the basket tube from rotating.

Preferably, the foldable frame further comprises a seat plate and a seat tube, the seat plate is fixed on the seat tube, and the lock device is connected to the seat tube.

Preferably, the lock member is fixed below seat plate.

Preferably, the unlock member comprises a fixing block fixed on the seat plate and an engaging member movably disposed in the fixing block, the engaging member has an engaging end, when the lock device is locked, the engaging end abuts against a bottom of the basket tube so as to restrain the basket tube from rotating with respect to the unlock member.

Preferably, the engaging member has a pull end connected to a belt.

Preferably, a through hole is formed on the seat plate and the belt passes through the through hole so as to be exposed on a surface of the seat plate.

Preferably, a second spring is disposed in the engaging member, a second rivet is slidably disposed in the engaging member, an end of the second spring abuts against the second rivet, and another end of the second spring abuts against the engaging member.

Preferably, a pedestal is disposed below the basket tube, when the lock device is locked, the engaging end abuts against the pedestal.

Preferably, the foldable frame further comprises a support rod, an end of the support rod is pivotally connected to the basket tube, and another end of the support rod is used for supporting the foldable frame on ground after the foldable frame is folded.

Preferably, the foldable frame further comprises a rear axle and a connecting member, the rear axle is connected to the rear leg, an end of the connecting member is pivotally connected to the rear axle, and another end of the connecting member is pivotally connected to the support rod.

Preferably, the foldable frame further comprises a backrest support tube, a backrest adjusting mechanism is disposed on the rear leg and has a plurality of engaging recesses, and the backrest support tube is electively engaged in one of the engaging recesses.

Preferably, the foldable frame further comprises a backrest support tube, a backrest adjusting mechanism is fixed on the connecting member, and the backrest support tube is detachably engaged with the backrest adjusting mechanism.

Preferably, the foldable frame further comprises a dining tray detachably connected to the foldable frame.

Preferably, the foldable frame further comprises an arm rest detachably connected to the foldable frame and the dining tray is detachably connected to the arm rest.

Compared with the prior art, the baby carriage of the invention can be folded through the lock device so as to avoid occupying much space. Furthermore, a user can pull the belt to fold the baby carriage so the operation is effort-saving and convenient.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
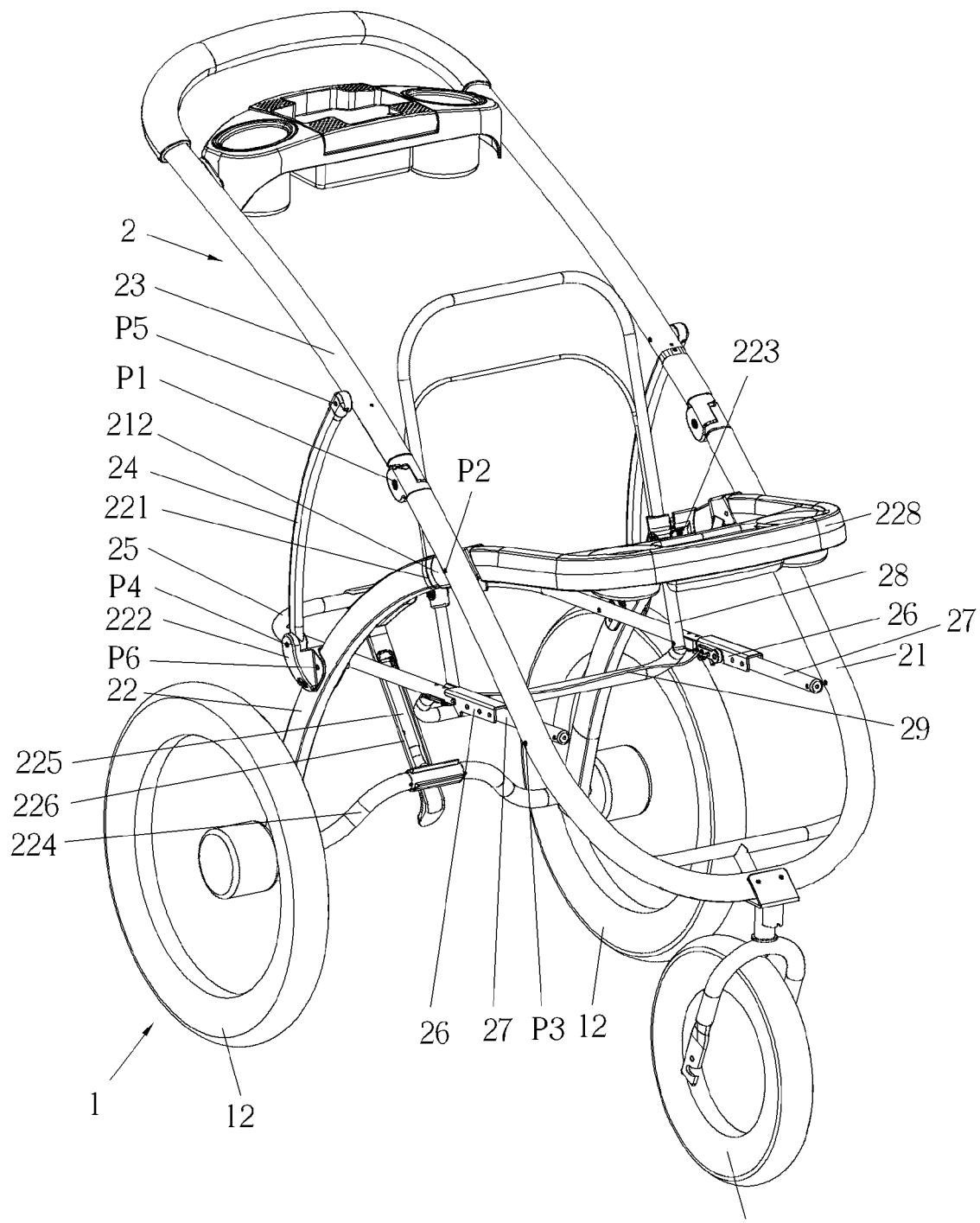
FIG. 1 is a perspective view illustrating a baby carriage according to a first embodiment of the invention.
Figure 2:
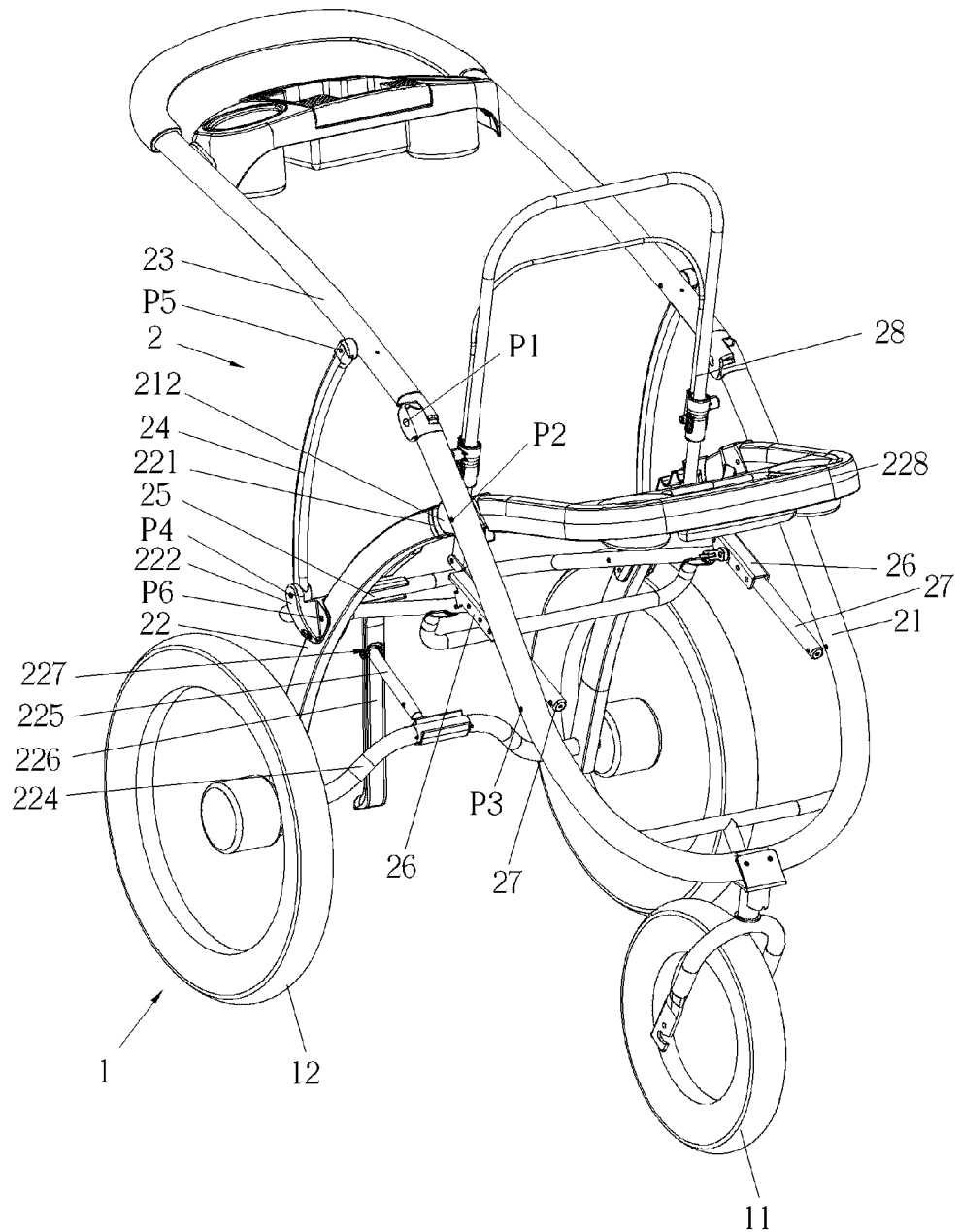
FIG. 2 is a schematic diagram illustrating the baby carriage shown in FIG. 1 being folded partially.
Figure 3:
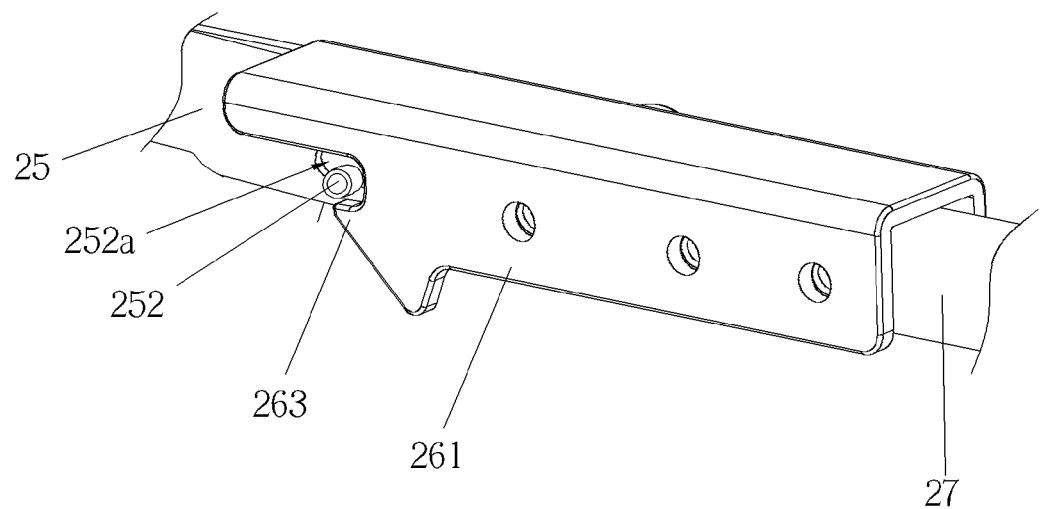
FIG. 3 is a schematic diagram illustrating the lock device shown in FIG. 1.
Figure 4:
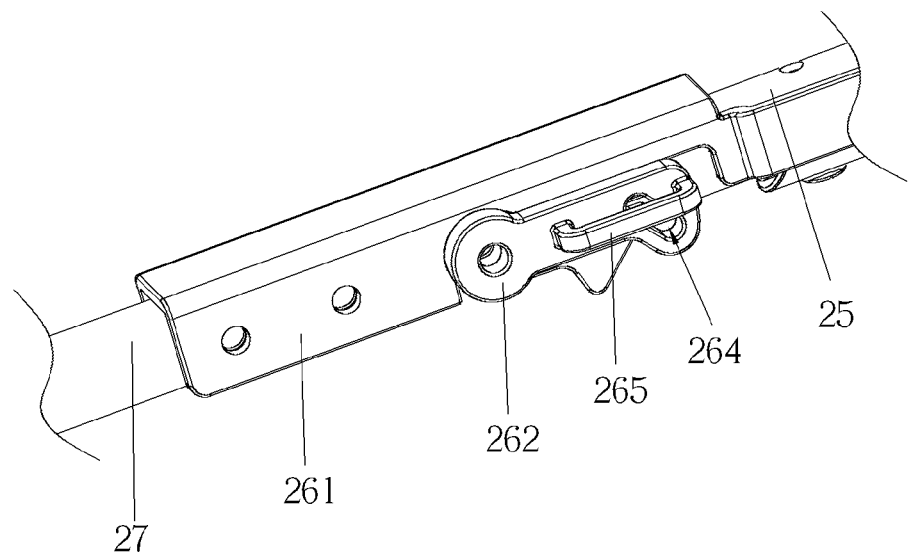
FIG. 4 is a schematic diagram illustrating the lock device shown in FIG. 3 from another viewing angle.
Figure 5:
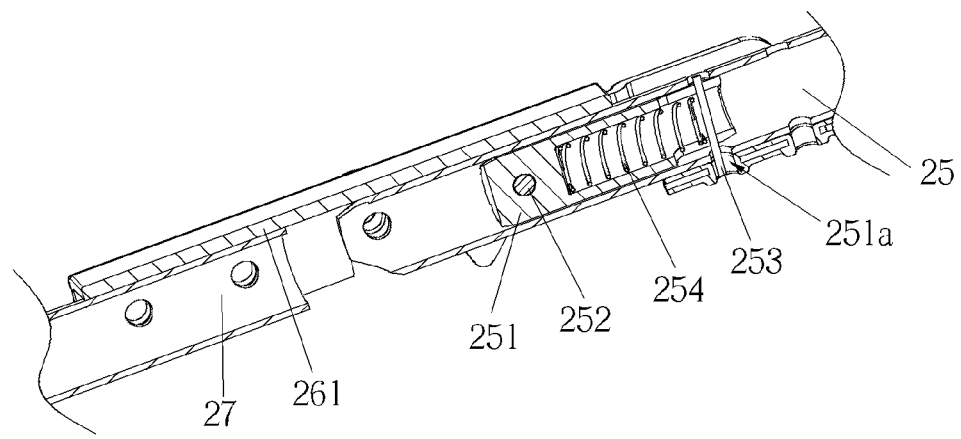
FIG. 5 is cross-sectional view of FIG. 4.
Figure 6:
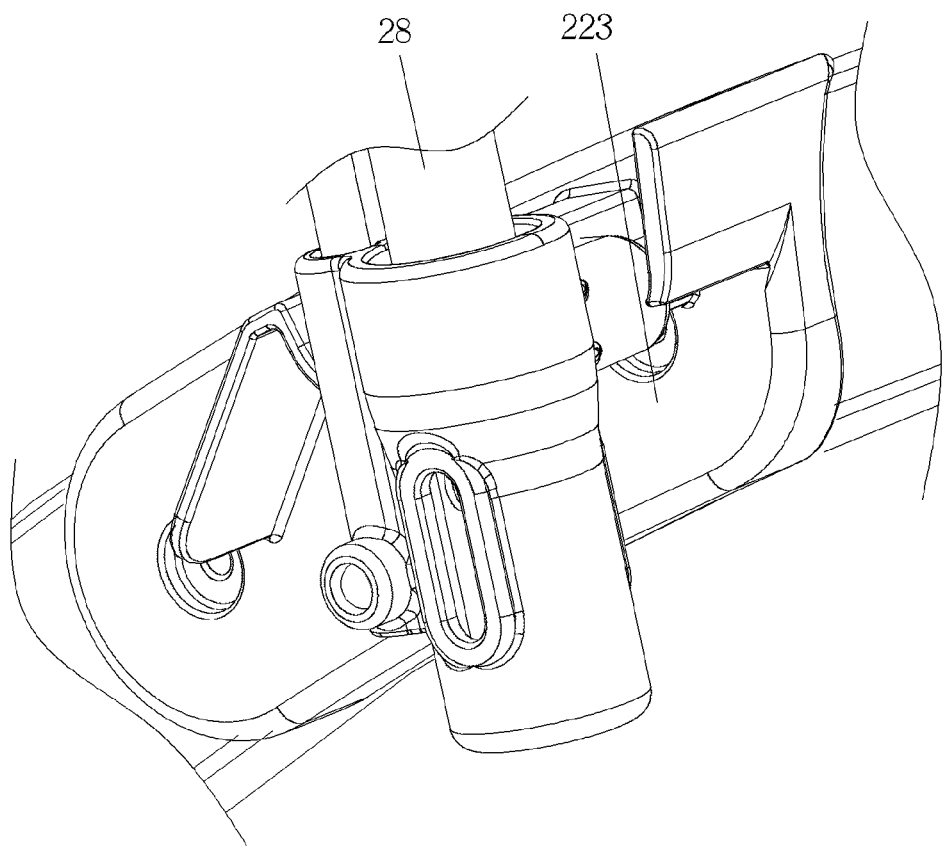
FIG. 6 is a schematic diagram illustrating the backrest adjusting mechanism and the backrest support tube shown in FIG. 1.

There are several embodiments of the invention described in the following with the appended drawings, wherein the same numerals in the drawings represent the same elements. As mentioned in the above, the invention provides a baby carriage capable of being folded so as to avoid occupying much space.

Referring to FIGS. 1 to 10, FIG. 1 is a perspective view illustrating a baby carriage according to a first embodiment of the invention. As shown in FIG. 1, the baby carriage of the invention comprises a wheel assembly 1 and a foldable frame 2 connected to the wheel assembly 1.

The wheel assembly 1 comprises a front wheel 11 and two rear wheels 12.

The foldable frame 2 comprises a front leg 21, a rear leg 22, a push handle 23 located above the rear leg 22 and connected to the front leg 21, two connecting rods 24 located between the push handle 23 and the rear leg 22, a basket tube 25 located on inner side of the rear leg 22, two lock devices 26 connected to the basket tube 25, two seat tubes 27 connected to the two lock devices 26, a backrest support tube 28 connected to the two lock devices 26, and a belt 29, wherein both ends of the belt 29 are connected to the two lock devices 26, respectively. The belt 29 can be pulled by a user.

The front wheel 11 is pivotally connected to the front leg 21 and the rear wheels 12 are pivotally connected to the rear leg 22. The front leg 21 is pivotally connected to the rear leg 22 at a pivot point P2. The push handle 23 is pivotally connected to a top end of the front leg 21 at a pivot point P1. Both ends of the connecting rod 24 are pivotally connected to the push handle 23 and the rear leg 22 at pivot points P5 and P4, respectively. The basket tube 25 is pivotally connected to the rear leg 22 at a pivot point P6. The seat tube 27 is pivotally connected to the front leg 21 at a pivot point P3. Preferably, the front leg 21 is U-shaped. A pinch-proof member 212 is disposed at a joint between the front leg 21 and the rear leg 22 so as to prevent a hand of the user from being pinched by the foldable frame 2 during folding operation.

Figure 7:
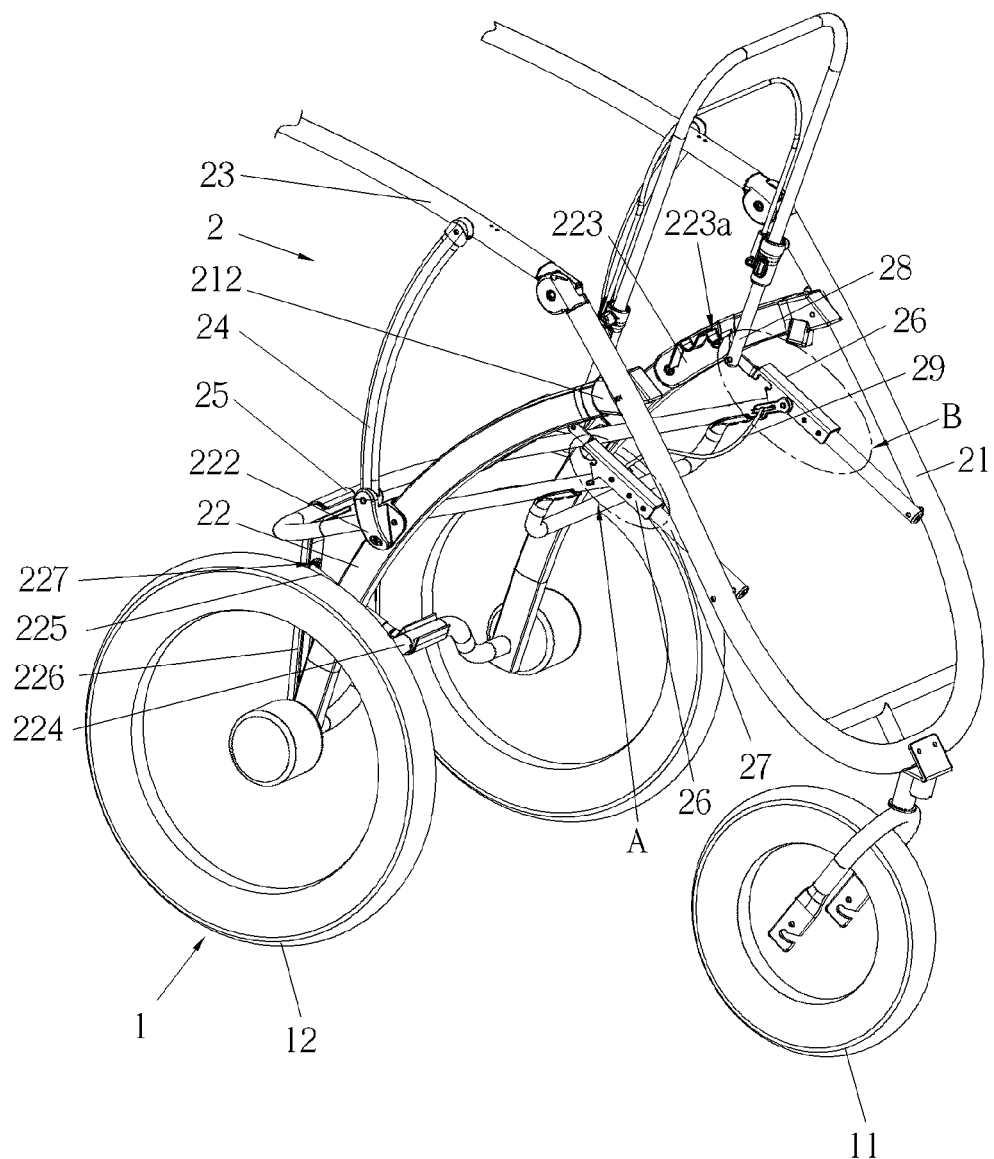
FIG. 7 is a schematic diagram illustrating the baby carriage shown in FIG. 1 being folded partially.
Figure 8:
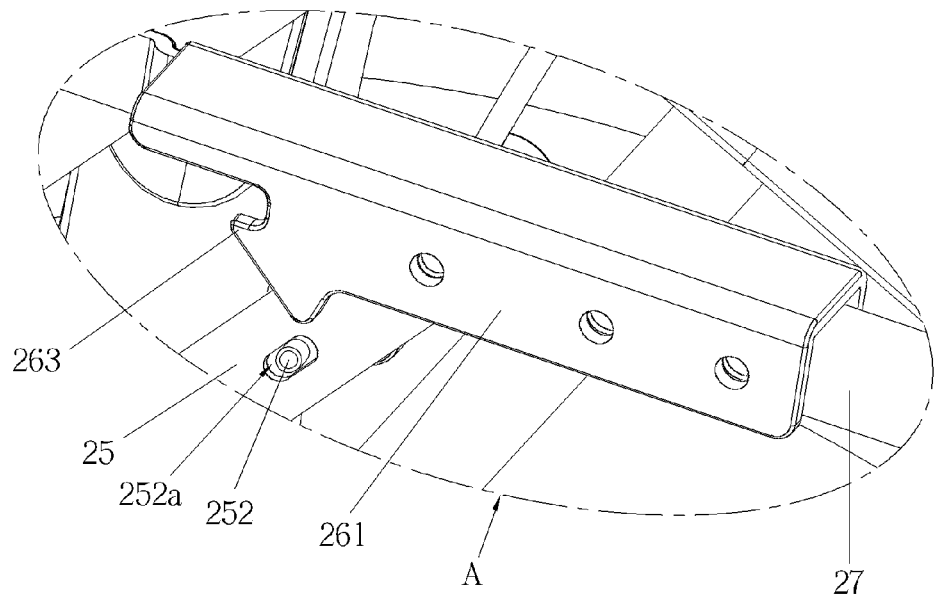
FIG. 8 is an enlarged view illustrating the section A shown in FIG. 7.

As shown in FIG. 1, the rear leg 22 and the dining tray 228 are substantially U-shaped. A first connecting member 221 is disposed on the rear leg 22 and close to the dining tray 228 and the front leg 21. A second connecting member 222 is fixed on a middle portion of the rear leg 22. A backrest adjusting mechanism 223 is disposed between the first connecting member 221 and the second connecting member 222 and the backrest adjusting mechanism 223 has a plurality of engaging recesses 223a formed thereon, as shown in FIG. 7. The first connecting member 221 is pivotally connected to the front leg 21. The pinch-proof member 212 is located between the front leg 21 and the first connecting member 221. The backrest support tube 28 can be selectively connected to one of the engaging recesses 223a on the backrest adjusting mechanism 223 such that a user can adjust a tilt angle of the backrest support tube 28. The rear leg 22 is connected to the rear wheels 12 by a rear axle 224. A third connecting member 225 is pivotally connected to the rear axle 224. A support member 226 is connected to the third connecting member 225. An upper end of the support member 226 is pivotally connected to the basket tube 25 and a lower end of the support member 226 is used for supporting the foldable frame 2 on ground after the foldable frame 2 is folded. Referring to FIG. 7, a connecting hole 227 is formed on the support member 226 and an end of the third connecting member 225, which connects the support member 226, is inserted into the connecting hole 227.

The push handle 23 is also U-shaped, wherein two arms of the push handle 23 are pivotally connected to two arms of the front leg 21, respectively. An upper end of the connecting rod 24 is pivotally connected to the push handle 23 and a lower end of the connecting rod 24 is pivotally connected to the second connecting member 222.

The basket tube 25 is also U-shaped, wherein two arms of the basket tube 25 are pivotally connected to the second connecting member 222. A front end of the basket tube 25 is connected to the seat tube 27 through the lock device 26. A driving member 251 is disposed inside the front end of each arm of the basket tube 25. A lock pin 252 is fixed on a front end of the driving member 251 and passes through a restraining groove 252a formed on the basket tube 25. A sliding groove 251a is formed on a rear end of the driving member 251 and a rivet 253 is disposed in the sliding groove 251a such that the driving member 251 can slide with respect to the rivet 253. A spring 254 is disposed in the driving member 251 and both ends of the spring 254 abut against the driving member 251 and the rivet 253, respectively.

Figure 9:
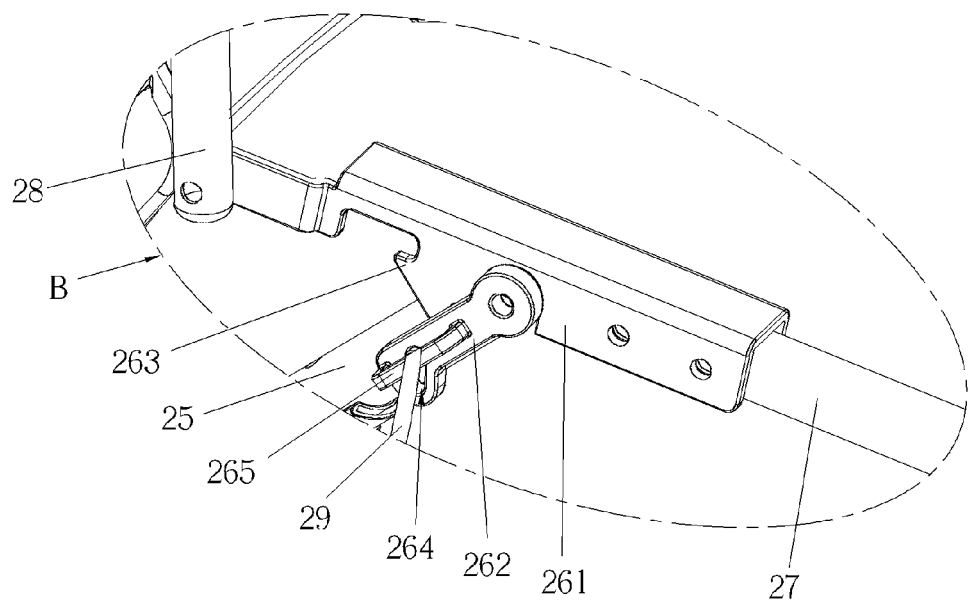
FIG. 9 is an enlarged view illustrating the section B shown in FIG. 7.
Figure 10:
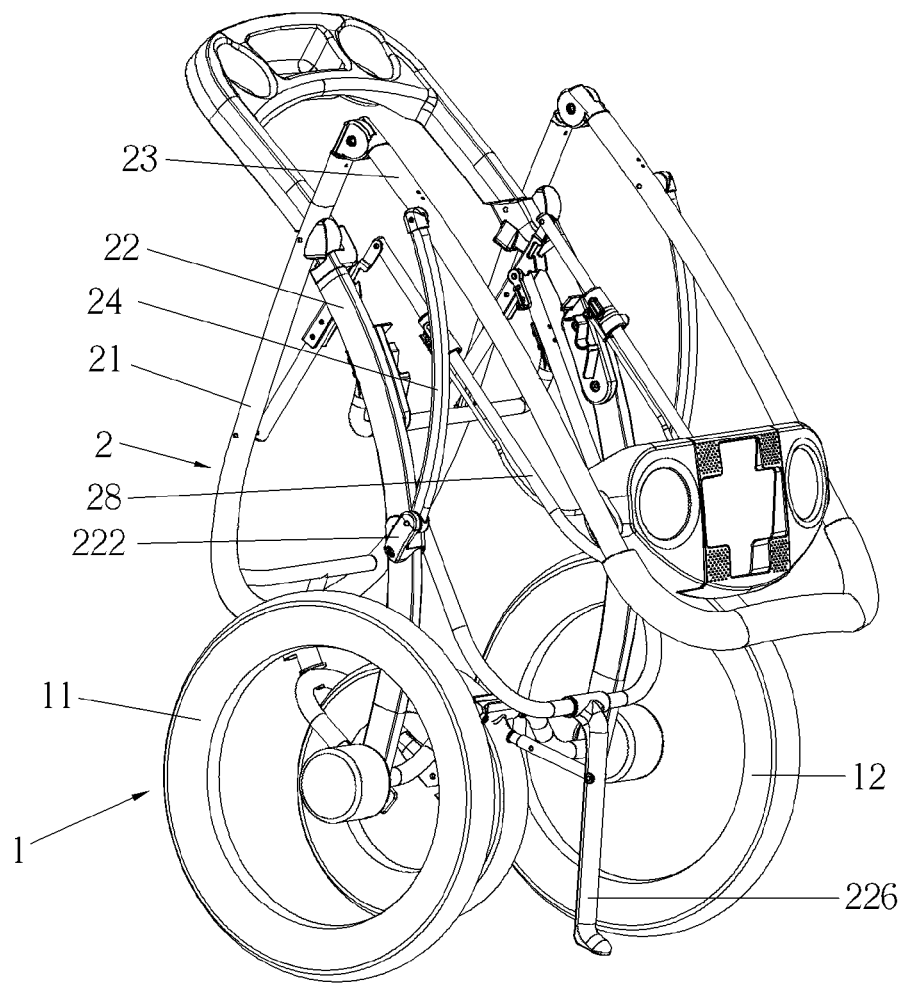
FIG. 10 is a schematic diagram illustrating the baby carriage shown in FIG. 1 being folded completely.

Referring to FIG. 9, the lock device 26 comprises a lock member 261 and an unlock member 262. The basket tube 25 is pivotally connected to the lock member 261. A rear end of the lock member 261 is pivotally connected to the backrest support tube 28 and a front end of the lock member 261 is fixed on the seat tube 27. A lock hook 263 is disposed on the lock member 261 and used for hooking the lock pin 252 so as to keep the foldable frame 2 in an expanded state. An oblique groove 264 is formed on the unlock member 262 and the lock pin 252 is movably disposed in the oblique groove 264. A fixing ring 265 protrudes from the unlock member 262 inwardly and the belt 29 is connected to the fixing ring 265.

A front end of the seat tube 27 is pivotally connected to the front leg 21 and a rear end of the seat tube 27 is fixed on the lock member 261.

The backrest support tube 28 is also U-shaped, wherein two arms of the backrest support tube 28 can be selectively engaged with the backrest adjusting mechanism 223 and a tail end of each arm of the backrest support tube 28 is pivotally connected to a rear end of the lock member 261.

Both ends of the belt 29 are fixed on the fixing rings 265 of the two lock devices 26, respectively.

The folding operation is described in the following. As shown in FIG. 7, to fold the foldable frame 2, a user can pull the belt 29 upward to pivot the unlock member 262 with respect to the lock member 261 so as to drive the lock pin 252 to move along the oblique groove 264 and push the lock pin 252 to slide along the restraining groove 252a so as to be disengaged from the lock hook 263. That is to say, the basket 25 can rotate freely with respect to the lock member 261. At this time, the driving member 251 moves along with the lock pin 252 to compress the spring 254. When the user continues to pull the belt 29 upward, the rear leg 22 moves forward, the push handle 23 moves backward and downward, the basket 25 moves downward and then the backrest support tube 28 is disconnected from the backrest adjusting mechanism 223. Consequently, the user can rotate the backrest support tube 28 backward and downward so as to fold the foldable frame 2. After folding the foldable frame 2, it occupies less space and the support member 226 can support the foldable frame 2 on the ground vertically so that the foldable frame 2 can stand on the ground.

Figure 11:
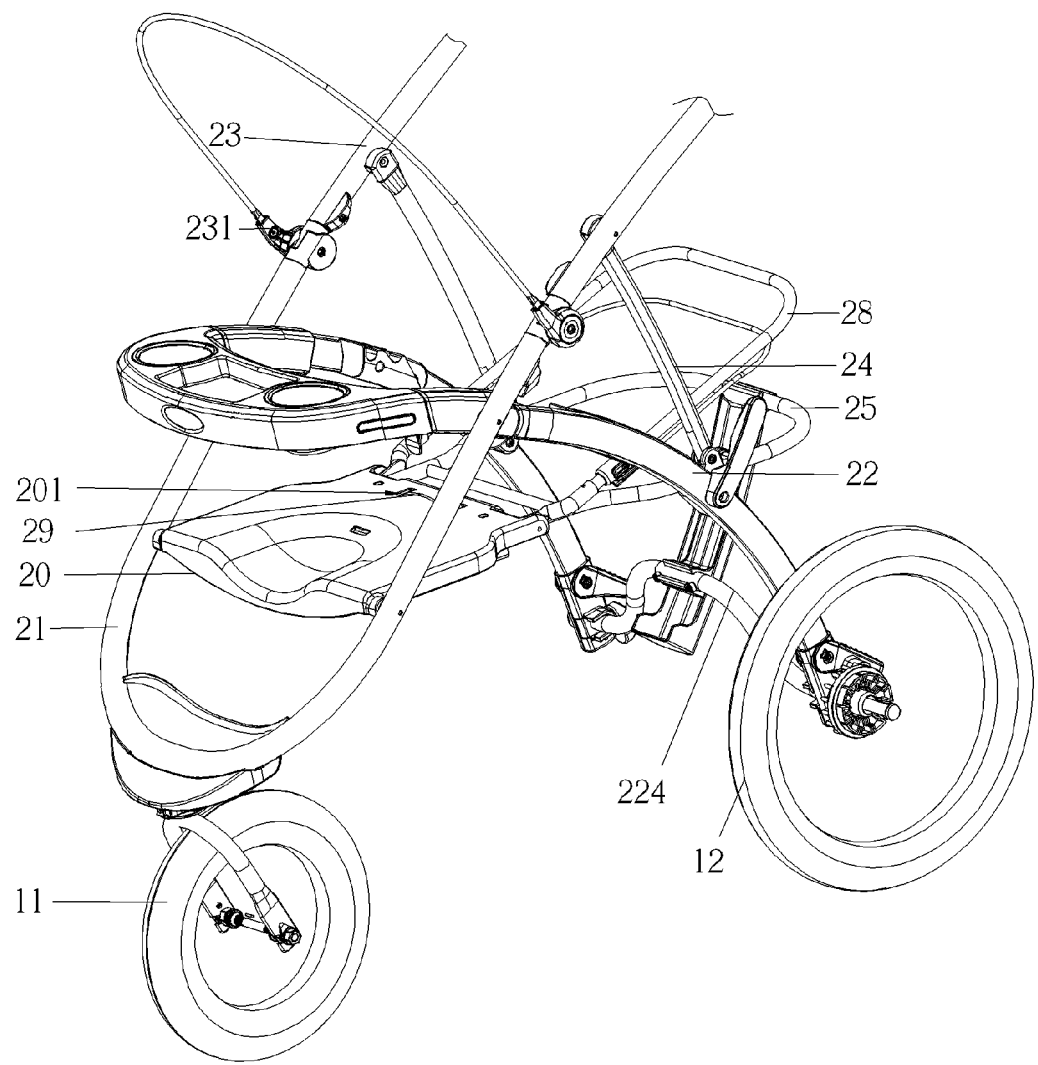
FIG. 11 is a perspective view illustrating a baby carriage according to a second embodiment of the invention.
Figure 12:
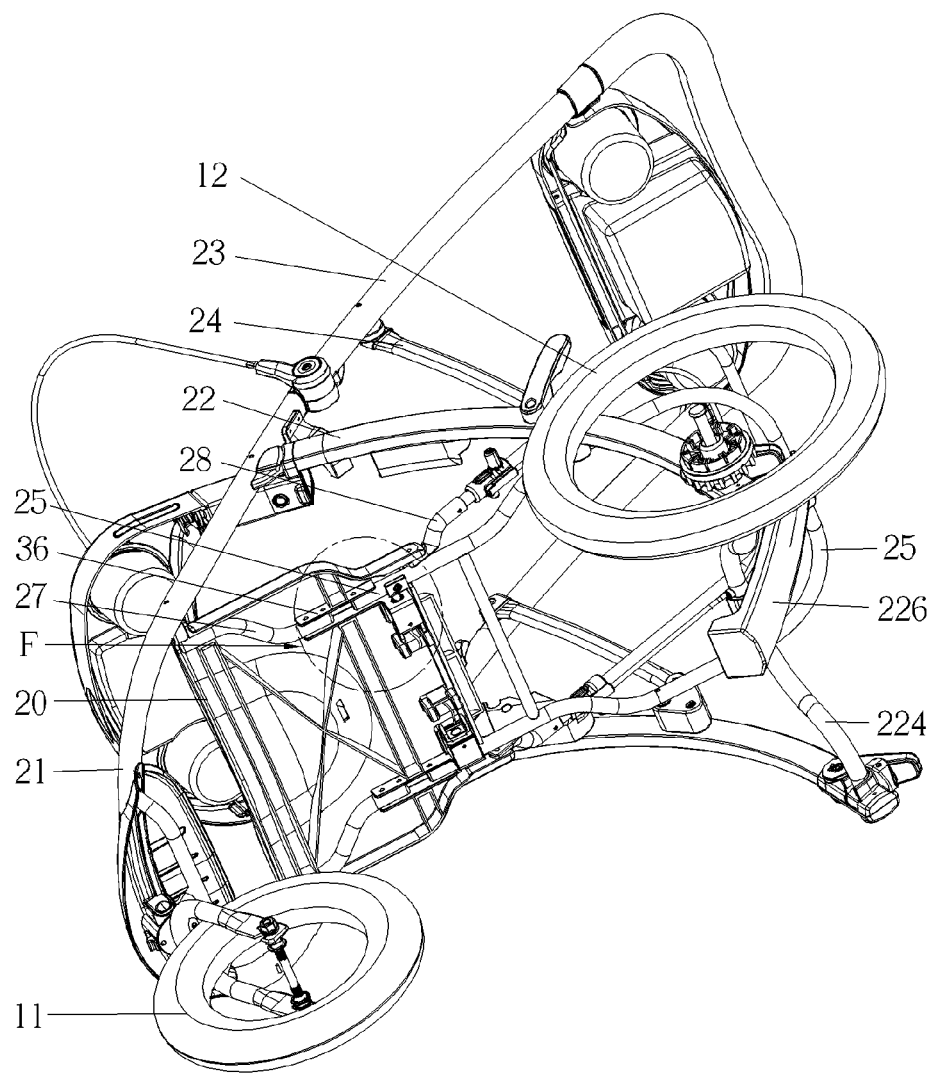
FIG. 12 is a schematic diagram illustrating the baby carriage shown in FIG. 11 from another viewing angle.

Referring to FIGS. 11 to 16 according to a second embodiment of the invention, the difference between this embodiment and the aforesaid first embodiment is that, as shown in FIG. 11, the foldable frame 2 further comprises a seat plate 20 fixed on the seat tube 27 and a rear end of the seat plate 20 is pivotally connected to the backrest support tube 28. A through hole 201 is formed on the seat plate 20. The belt 29 passes through the through hole 201 so as to be exposed on a surface of the seat plate 20. A canopy fixing socket 231 is fixed at a joint between the push handle 23 and a top end of the front leg 21. An upper end of the support member 226 is pivotally connected to the basket tube 25 and a lower end of the support member 226 is pivotally connected to the rear axle 224. Furthermore, the structure of the lock device 36 is different from that of the lock device 26 of the aforesaid embodiment and is further described in the following.

Figure 13:
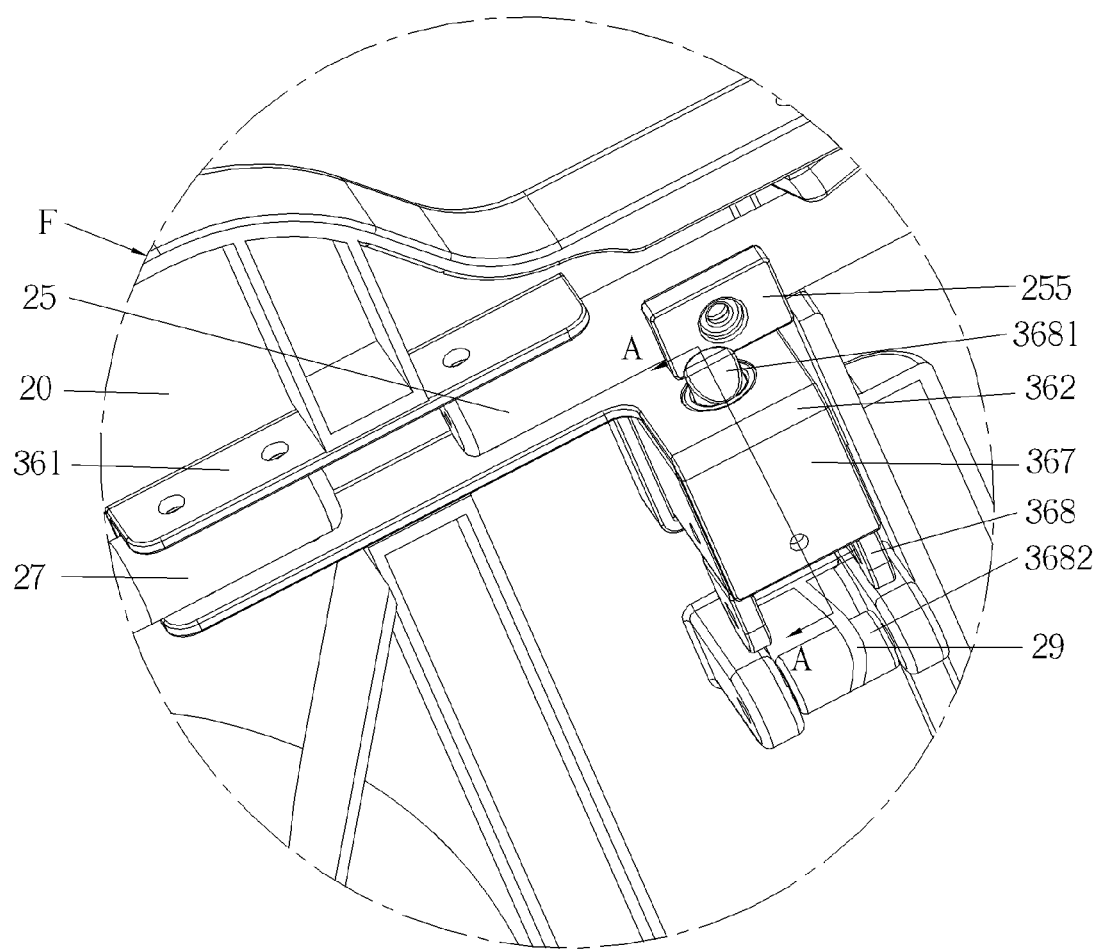
FIG. 13 is an enlarged view illustrating the section F shown in FIG. 12.
Figure 14:
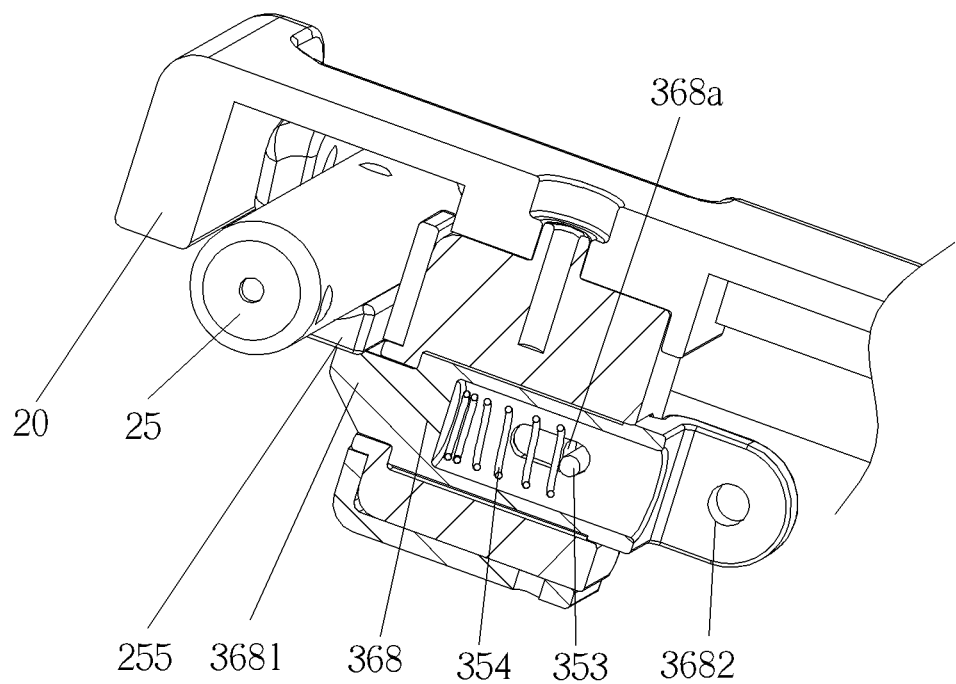
FIG. 14 is a partial cross-sectional view of FIG. 13 along line A-A.
Figure 15:
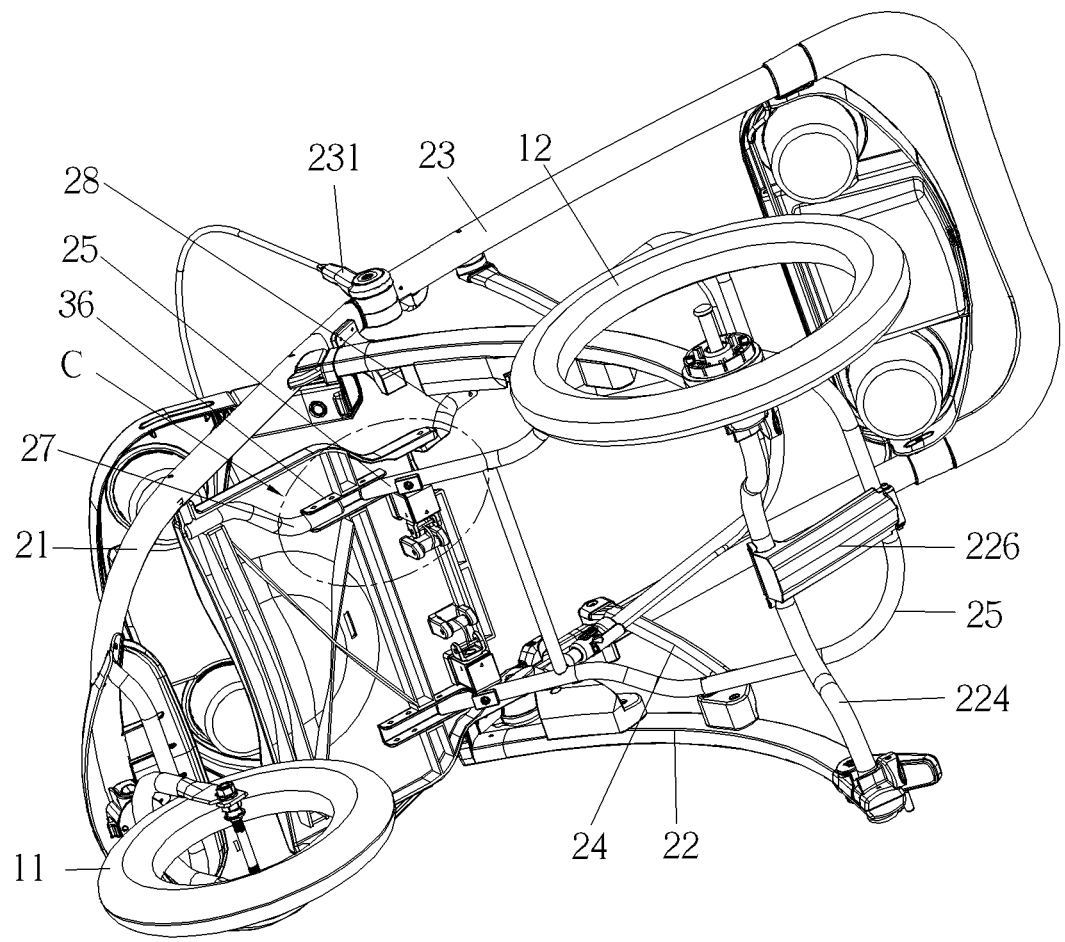
FIG. 15 is a schematic diagram illustrating the baby carriage shown in FIG. 11 being folded partially.

As shown in FIGS. 13 and 14, the lock member 361 is fixed below the seat plate 20, a front end of the lock member 361 is fixed on the seat tube 27, and a rear end of the lock member 361 is pivotally connected to the basket tube 25. The unlock member 362 comprises a fixing block 367 fixed on the seat plate 20 and an engaging member 368 movably disposed in the fixing block 367. An engaging end 3681 of the engaging member 368 abuts against a bottom of the basket tube 25 so as to restrain the basket tube 23 from rotating with respect to the lock member 361. A pull end 3682 of the engaging member 368 is connected to the belt 29. As shown in FIG. 13, a pedestal 255 is preferably fixed on the basket tube 25 and the engaging end 3681 abuts against the pedestal 255 such that the basket tube 25 can be engaged with the engaging end 3681 tightly.

A spring 354 and a rivet 353 are disposed in the engaging member 368. A restraining groove 368a is formed in the engaging member 368. The restraining groove 368a is formed on the engaging member 368 and adjacent to the spring 354. The rivet 353 is movably disposed in the restraining groove 368a. An end of the spring 354 abuts against the rivet 353 and another end of the spring 354 abuts against an inner wall of the engaging member 368.

Figure 16:
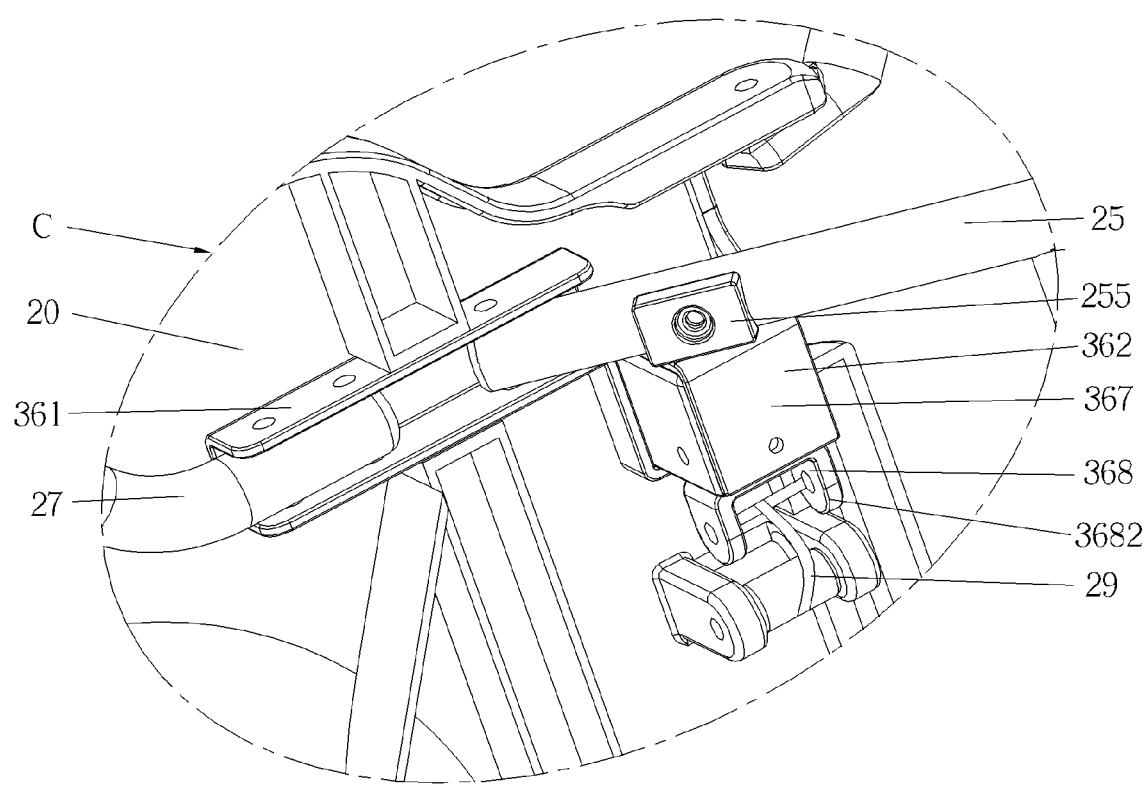
FIG. 16 is an enlarged view illustrating the section C shown in FIG. 15.

To fold the foldable frame 2, a user can pull the belt 29 upward to drive the engaging member 368 to move so as to disengage the engaging end 3681 from the basket tube 25, as shown in FIG. 16. The spring 354 is compressed at the same time. When the user continues to pull the belt 29 upward, the foldable frame 2 is folded and occupies less space accordingly.

Figure 17:
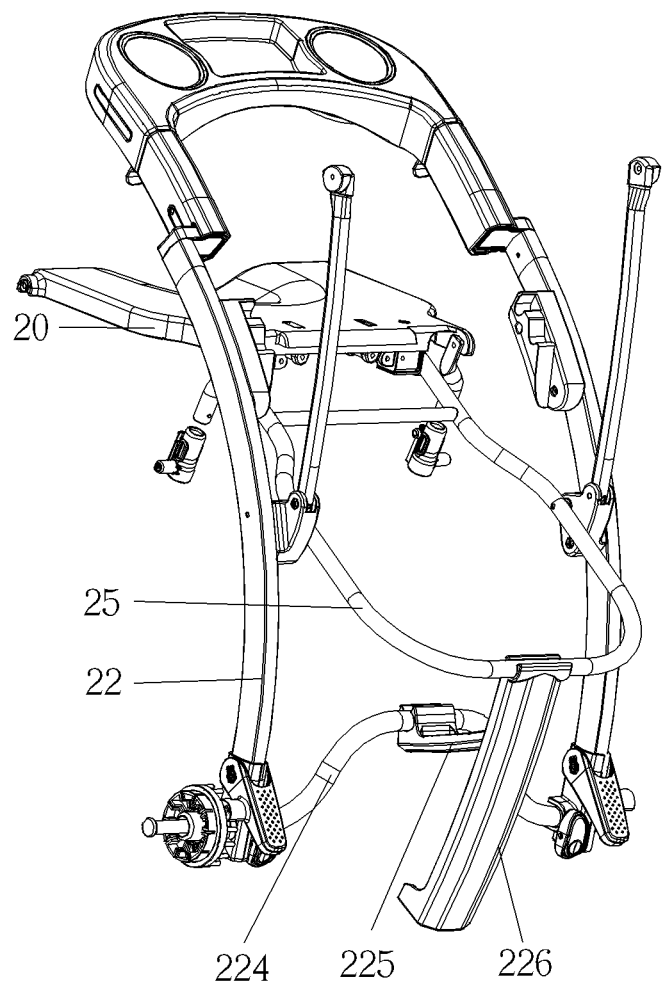
FIG. 17 is a perspective view illustrating a baby carriage according to a third embodiment of the invention.
Figure 18:
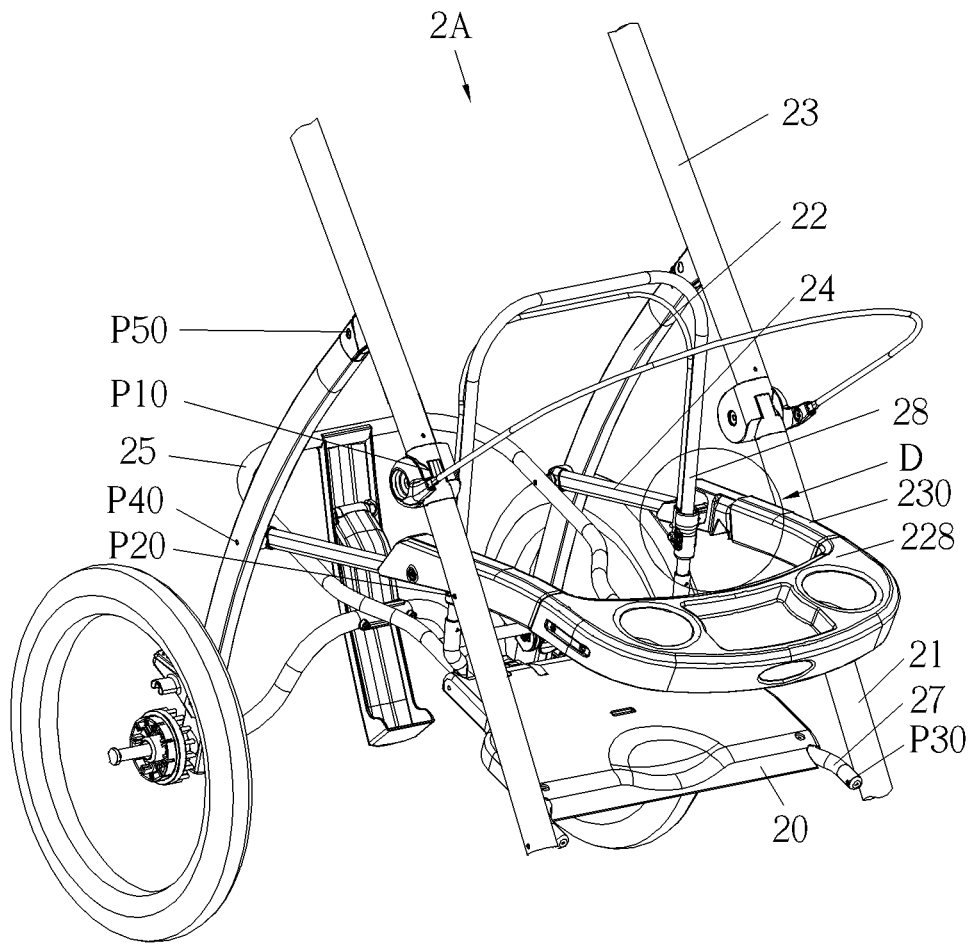
FIG. 18 is a perspective view illustrating a baby carriage according to a fourth embodiment of the invention.
Figure 19:
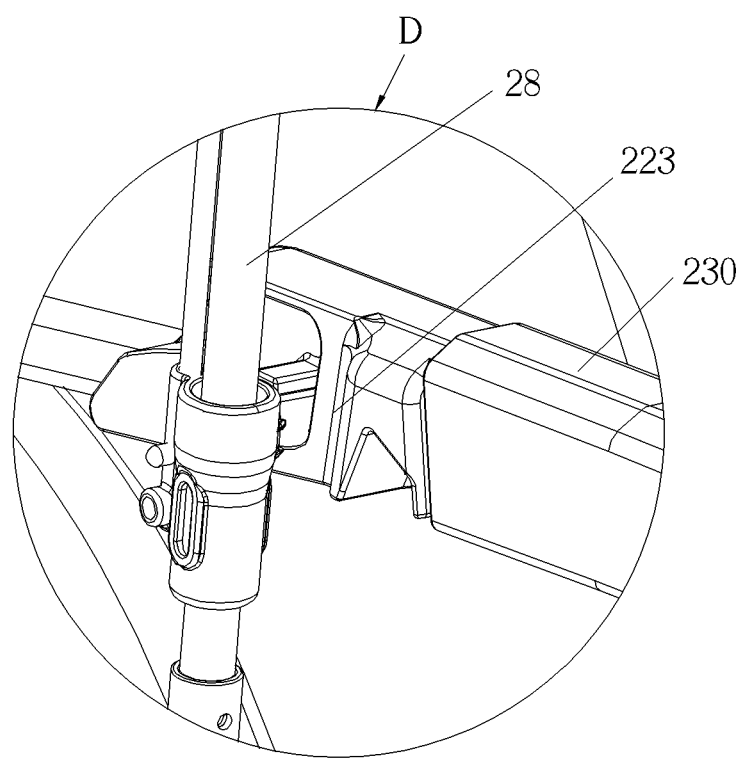
FIG. 19 is an enlarged view illustrating the section D shown in FIG. 18.

Referring to FIG. 17 according to a third embodiment of the invention, the difference between this embodiment and the aforesaid second embodiment is that a front end of the third connecting member 225 is pivotally connected to the rear axle 224 and a rear end of the third connecting member 225 is pivotally connected to the support member 226. Accordingly, after folding the foldable frame 2, the support member 226 can support the foldable frame 2 on the ground vertically so that the foldable frame 2 can stand on the ground.

Referring to FIGS. 18 to 22 according to a fourth embodiment of the invention, the difference between this embodiment and the aforesaid first and second embodiments is that both ends of the connecting rod 24 of the foldable frame 2A are pivotally connected to the front leg 21 and the rear leg 22 at pivot points P20 and P40, respectively. Also, the basket tube 25 is pivotally connected to the rear leg 22 at the pivot point P40. A top end of the rear leg 22 is pivotally connected to the push handle 23 at a pivot point P50. The push handle 23 is pivotally connected to a top end of the front leg 21 at a pivot point P10. The seat tube 27 is pivotally connected to the front leg 21 at a pivot point P30. The dining tray 228 is connected to a front end of the connecting rod 24. The backrest adjusting mechanism 223 is fixed on the front end of the connecting rod 24. The backrest adjusting mechanism 223 is located between the dining tray 228 and the connecting rod 24. The backrest support tube 28 is detachably connected to the backrest adjusting mechanism 223 such that a user can adjust a tilt angle of the backrest support tube 28. The lock device 26 of the first embodiment and the lock device 36 of the second embodiment both can be applied to the foldable frame of this embodiment.

Figure 20:
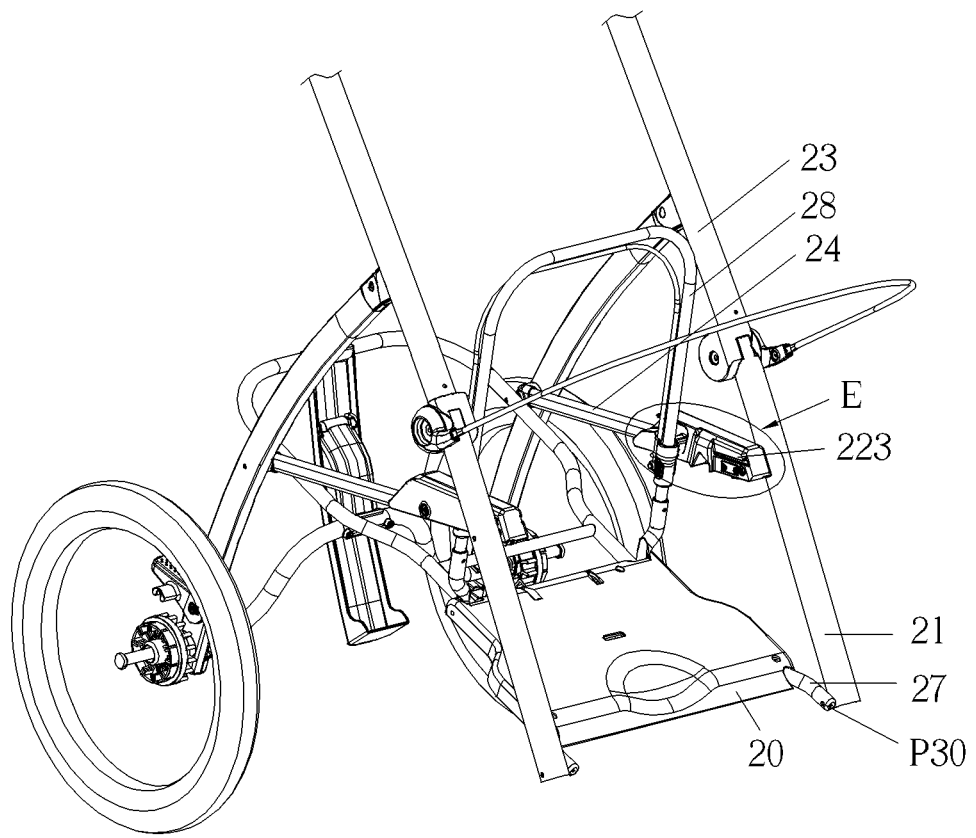
FIG. 20 is a schematic diagram illustrating the dining tray and the arm rest shown in FIG. 18 being detached from the baby carriage.
Figure 21:
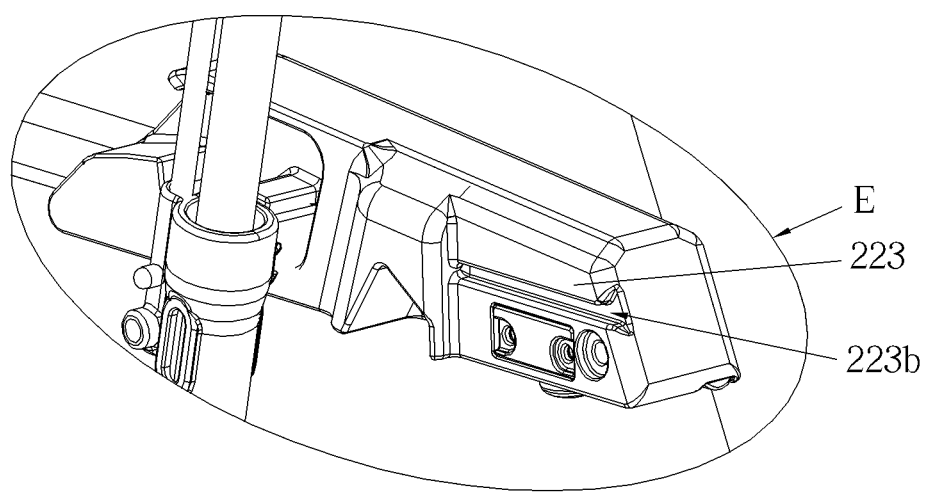
FIG. 21 is an enlarged view illustrating the section E shown in FIG. 20.
Figure 22:
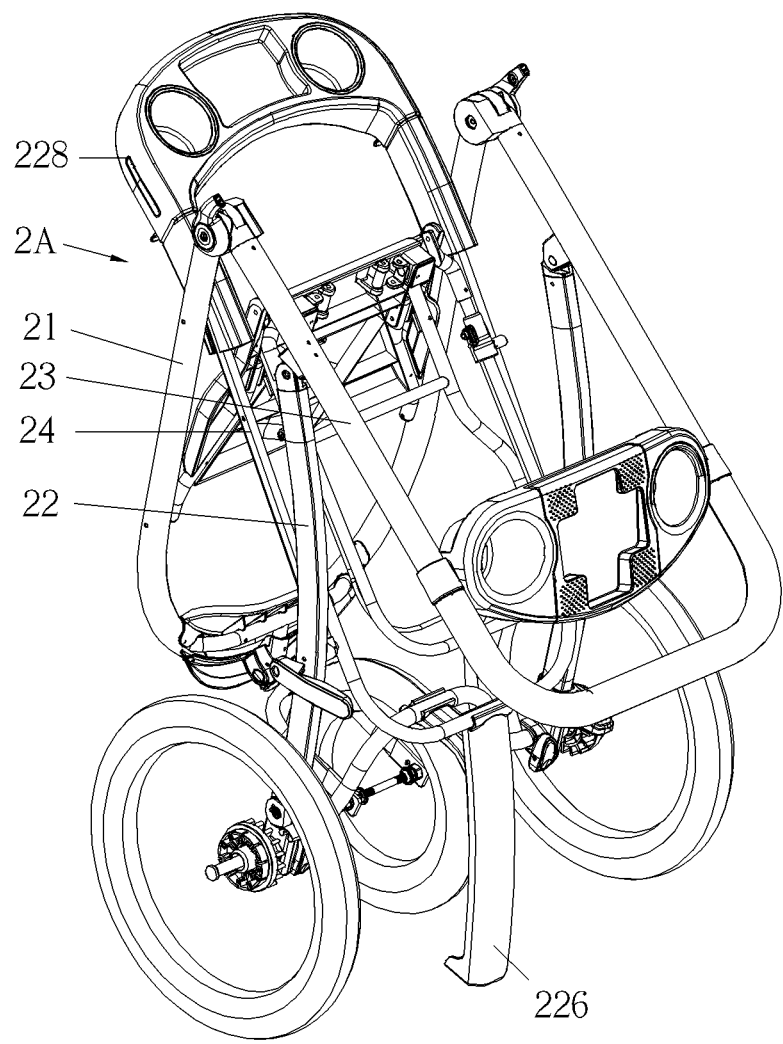
FIG. 22 is a schematic diagram illustrating the baby carriage shown in FIG. 18 being folded completely.

As shown in FIGS. 18 to 21, the dining tray 228 is detachably connected to a front end of the backrest adjusting mechanism 223. However, the invention is not limited to the aforesaid embodiment. The arm rest 230 can be detachably engaged with an engaging groove 223b formed on the backrest adjusting mechanism 223 through a protruding rib (not shown). When the dining tray 228 is not in use, the dining tray 228 and the arm rest 230 can be detached from the foldable frame 2A together, as shown in FIG. 20. Accordingly, the arm rest 230 will not protrude from the foldable frame 2A so as to enhance the appearance of the baby carriage.

As mentioned in the above, the baby carriage can be folded through the lock device 26 or the lock device 36 so as to avoid occupying much space. Furthermore, a user can pull the belt 29 to fold the baby carriage so the operation is effort-saving and convenient.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A baby carriage comprising:
    a wheel assembly; and
    a foldable frame connected to the wheel assembly, the foldable frame comprising a front leg, a rear leg, a push handle located above the rear leg and connected to the front leg, a connecting rod, and a basket tube located on the rear leg, the front leg and the rear leg being connected to the wheel assembly, the push handle being pivotally connected to the front leg, an end of the connecting rod being pivotally connected to the rear leg;
    wherein the foldable frame further comprises a seat tube, a seat plate fixed on the seat tube, and a lock device connected to the basket tube, the lock device comprises an unlock member, the unlock member restrains the basket tube from rotating, the unlock member comprises a fixing block fixed on the seat plate and an engaging member movably disposed in the fixing block, the engaging member has an engaging end, when the lock device is locked, the engaging end abuts against a bottom of the basket tube so as to restrain the basket tube from rotating with respect to the unlock member.

2. The baby carriage of claim 1, wherein the basket tube is pivotally connected to the rear leg.

3. The baby carriage of claim 2, wherein the connecting rod is connected between the push handle and the rear leg, and another end of the connecting rod is pivotally connected to the push handle.

4. The baby carriage of claim 3, wherein the front leg is pivotally connected to the rear leg.

5. The baby carriage of claim 4, wherein a pinch-proof member is disposed at a joint between the front leg and the rear leg.

6. The baby carriage of claim 5, wherein a first connecting member is disposed on the rear leg and pivotally connected to the front leg, and the pinch-proof member is located between the front leg and the first connecting member.

7. The baby carriage of claim 6, wherein a second connecting member is fixed on the rear leg, the connecting rod is pivotally connected to the second connecting member, and the basket tube is also pivotally connected to the second connecting member.

8. The baby carriage of claim 1, wherein the connecting rod is connected between the front leg and the rear leg, and another end of the connecting rod is pivotally connected to the front leg.

9. The baby carriage of claim 8, wherein the push handle is pivotally connected to the rear leg.

10. The baby carriage of claim 1, wherein the lock device is connected to the seat tube, a front end of the basket tube and the seat tube are rotatably connected to each other, and a front end of the seat tube is pivotally connected to the front leg.

11. The baby carriage of claim 1, wherein the lock device comprises a lock member, the lock member is fixed on the seat tube and pivotally connected to the basket tube.

12. The baby carriage of claim 1, wherein the lock member is fixed below the seat plate.

13. The baby carriage of claim 1, wherein the engaging member has a pull end connected to a belt.

14. The baby carriage of claim 13, wherein a through hole is formed on the seat plate and the belt passes through the through hole so as to be exposed on a surface of the seat plate.

15. The baby carriage of claim 1, wherein a second spring is disposed in the engaging member, a second rivet is slidably disposed in the engaging member, an end of the second spring abuts against the second rivet, and another end of the second spring abuts against the engaging member.

16. The baby carriage of claim 1, wherein a pedestal is disposed below the basket tube, when the lock device is locked, the engaging end abuts against the pedestal.

17. The baby carriage of claim 1, wherein the foldable frame further comprises a support rod, an end of the support rod is pivotally connected to the basket tube, and another end of the support rod is used for supporting the foldable frame on ground after the foldable frame is folded.

18. The baby carriage of claim 17, wherein the foldable frame further comprises a rear axle and a connecting member, the rear axle is connected to the rear leg, an end of the connecting member is pivotally connected to the rear axle, and another end of the connecting member is pivotally connected to the support rod.

19. The baby carriage of claim 1, wherein the foldable frame further comprises a backrest support tube, a backrest adjusting mechanism is disposed on the rear leg and has a plurality of engaging recesses, and the backrest support tube is electively engaged in one of the engaging recesses.

20. The baby carriage of claim 1, wherein the foldable frame further comprises a backrest support tube, a backrest adjusting mechanism is fixed on the connecting rod, and the backrest support tube is detachably engaged with the backrest adjusting mechanism.

21. The baby carriage of claim 1, wherein the foldable frame further comprises a dining tray detachably connected to the foldable frame.

22. The baby carriage of claim 21, wherein the foldable frame further comprises an arm rest detachably connected to the foldable frame and the dining tray is detachably connected to the arm rest.

* * * * *